(No Model.)

A. SCHWEHR.
BICYCLE TIRE.

No. 586,400. Patented July 13, 1897.

Witnesses:
Otto F. Barthel
M. B. Dogherty

Inventor:
Albert Schwehr,
By Thos. S. Sprague & Son,
Attorneys.

UNITED STATES PATENT OFFICE.

ALBERT SCHWEHR, OF SANDUSKY, OHIO.

BICYCLE-TIRE.

SPECIFICATION forming part of Letters Patent No. 586,400, dated July 13, 1897.

Application filed July 27, 1896. Serial No. 600,665. (No model.)

*To all whom it may concern:*

Be it known that I, ALBERT SCHWEHR, a citizen of the United States, residing at Sandusky, in the county of Erie and State of Ohio, have invented certain new and useful Improvements in Bicycle-Tires, of which the following is a specification, reference being had therein to the accompanying drawings.

The invention consists in the construction of a vehicle-tire, and particularly in the construction of a hollow rubber tire, which is reinforced within by metallic springs, whereby injury to the tire in the way of puncture will not affect its elasticity, as is the case with ordinary pneumatic tires.

The invention further consists in the peculiar construction of the reinforcing-springs and in the means for connecting these springs together, all as more fully hereinafter described.

Figure 1:
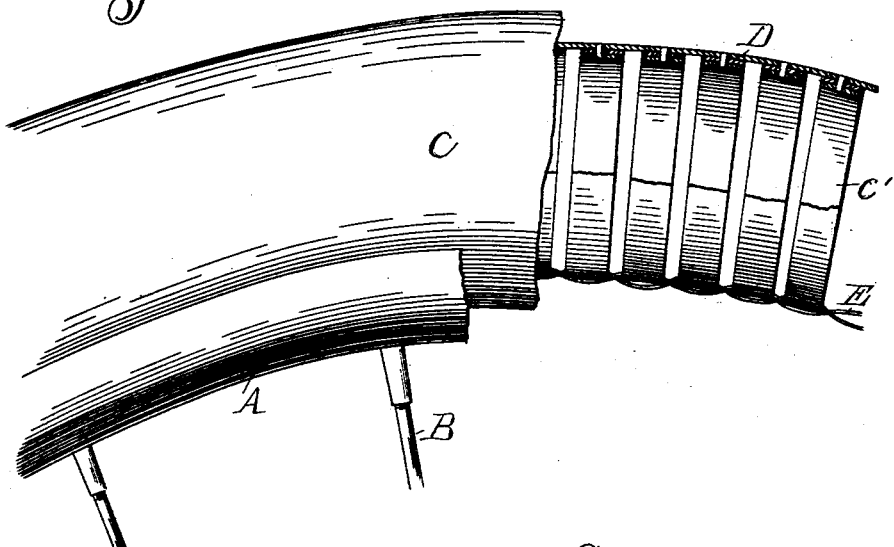
Figure 2:
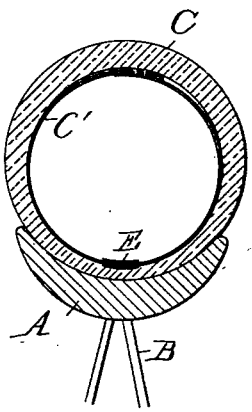
Figure 3:
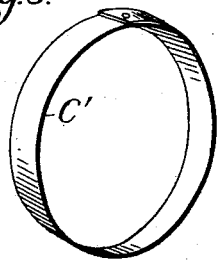

In the drawings, Figure 1 is a sectional elevation showing part of the tire embodying my invention. Fig. 2 is a cross-section thereof, and Fig. 3 is a detached perspective view of one of the hoop-shaped springs.

A represents the rim of a wheel of a vehicle—such, for instance, as a bicycle—and B are the spokes. In this rim is secured the hollow rubber tire C. This tire may be inflated by air, if desired, or it may be retained in its expanded position solely by the reinforcing-springs, which are of the following construction.

C' are hoop-shaped springs, preferably of flat sheet metal, the ends being connected together by an exterior hoop or securing-strip D, while the inner points of these hoop-shaped springs are connected together by an elastic connecting cord or strip E. I have shown this inner strip composed of two elastic tapes woven between the inner faces of the hoops, as shown. These reinforcing-springs are then inserted into the tire, or they may be molded in—that is, the tire molded about the reinforcing-spring. Thus made the resulting structure is as shown in Fig. 1.

When thus made, the tire may be readily attached or detached to the rim of the wheel.

I deem it an essential part of my invention that the inner points of these hooped-shaped springs shall be of a flexible strip or strips. This enables me to engage the tire over the rim of the wheel after the tire is completely made, as any part of the tire can be compressed or expanded for this purpose. The hoops being secured together prevents any possibility of their displacement by reason of their use, and I find the construction as a whole to be desirable.

What I claim as my invention is—

A tire for vehicle-wheels consisting of a hollow rubber tube, a reinforcing means therefor, consisting of a series of separate hoop-shaped springs, the connecting-strip D at the outermost point thereof and the flexible tapes E woven between the innermost points thereof, as and for the purpose described.

In testimony whereof I affix my signature in presence of two witnesses.

ALBERT SCHWEHR.

Witnesses:
  JAMES FLYNN,
  GEO. F. ANDERSON.